United States Patent [19]

Kobayashi et al.

[11] Patent Number: 4,726,685
[45] Date of Patent: Feb. 23, 1988

[54] OPTICAL MEASURING DEVICE FOR DETECTING SURFACE CHARACTERISTICS OF OBJECT

[75] Inventors: Shohei Kobayashi, Shimosuwa Machi; Kenichi Ito, Okaya, both of Japan

[73] Assignee: Olympus Optical Company Limited, Tokyo, Japan

[21] Appl. No.: 875,508

[22] Filed: Jun. 18, 1986

Related U.S. Application Data

[63] Continuation of Ser. No. 551,948, Nov. 15, 1983, abandoned.

[30] Foreign Application Priority Data

Nov. 16, 1982 [JP] Japan ................... 57-200753

[51] Int. Cl.⁴ .................... G01J 21/55; G11B 7/09
[52] U.S. Cl. ..................... 356/445; 250/201; 369/45
[58] Field of Search ............ 356/448, 373, 445; 250/201 DF, 201 AF; 369/44, 43, 45, 46

[56] References Cited

U.S. PATENT DOCUMENTS

| | | | |
|---|---|---|---|
| 4,037,959 | 7/1977 | Bumgardner | 356/73 |
| 4,262,208 | 4/1981 | Suzki et al. | 356/446 X |
| 4,390,781 | 6/1983 | Musha | 369/45 X |
| 4,422,168 | 12/1983 | Ito et al. | 369/45 |
| 4,423,495 | 12/1983 | Musha et al. | 250/201 DF X |
| 4,450,547 | 5/1984 | Nakamura et al. | 250/201 DF X |
| 4,453,239 | 6/1984 | Musha et al. | 250/201 DF X |
| 4,455,085 | 6/1984 | Kato et al. | 250/201 DF |
| 4,464,050 | 8/1984 | Katz et al. | 356/446 X |

FOREIGN PATENT DOCUMENTS 856006 12/1960 United Kingdom ........... 356/373

*Primary Examiner*—Vincent P. McGraw
*Attorney, Agent, or Firm*—Bruce L. Adams; Van C. Wilks

[57] ABSTRACT

In an optical measuring device including a laser ray source, a polarization prism, an objective lens to condensing parallel ray to the surface of a substance to be measured, and divided photo-sensor means to detect reflected ray, the divided photo-sensor means is two divided photo-sensors, to eliminate noise effect caused by the laser ray source.

14 Claims, 5 Drawing Figures

OPTICAL MEASURING DEVICE FOR DETECTING SURFACE CHARACTERISTICS OF OBJECT

This is a continuation of application Ser. No. 551,948, filed Nov. 15, 1983, now abandoned.

BACKGROUND OF THE INVENTION

The present invention relates to an optical measuring device to optically measure microdisplacement and/or surface roughness of a substance to be measured.

It is well known to utilize a laser ray as a light source of such an optical measuring device. In such devices, microdisplacement and/or surface roughness of the substance to be measured can be measured by utilizing the off-focus of an objective lens, e.g. as disclosed in Japanese Laid Open Patent Application No. 7246/1981.

FIGS. 1 and 2 show an above-mentioned type conventional optical measuring device. Referring to the drawings, 1 designates a laser ray source, 2 is a collimator lens and 3 is a polarizing prism. The polarizing lens 3 is placed such that the incident ray or beam from the laser light source is transformed to a polarized ray or beam. Reference numeral 4 designates a quarter wavelength plate, 5 is an objective lens, and 6 is a reflective substance to be measured. A prism 7 guides a reflected ray or beam from the polarizing prism 3 to a divided light receiving photo-sensor 8 which will be described later. The reflecting surface 7c of the prism 7 is set to be about the critical angle relative to the optical axis of the reflected ray. The divided light receiving photo-sensor 8 has receiving surfaces 8A and 8B which are formed by dividing the surface 8 and the receiving surfaces are substantially normal to the incident surface of the prism 7. The division line 8C crosses the optical axis C of the reflected light at one point.

In operation of the device shown in FIGS. 1 and 2, a laser ray from the laser ray or beam source 1 is transformed into a parallel ray by the collimator lens 2 and passes through the polarization prism 3 as polarized ray P. The polarized ray P from the prism 3 passes the quarter wavelength plate 4 and is transformed into a circuler polarized ray. Then the laser ray is condensed by the objective lens 5 on the surface of the reflecting substance 6.

The laser ray impinging on the reflecting substance is reflected therefrom and passes through the objective lens and the quarter wavelength plate 4. The ray passing through the plate 4 is polarized by the polarization prism 3 which reflects the ray to the prism 7. The ray reflected from the reflecting surface 7C of the prism 7 impinges on the divided photo-sensor 8 which detects the quantity of the ray.

When the surface of the reflecting substance 6 which is to be measured coincides with the focus of the objective lens 5, the reflected light through the objective lens 5 is a parallel ray so that the incident angle of the reflected ray to the prism 7 is the same all along the surface. Thus, the quantity of the reflected ray received by the photo-sensor 8 is uniformly distributed. When the surface of the reflecting substance 6 is displaced from the focus of the objective lens 5 in the direction of arrow X shown in FIG. 1, the reflected ray is a divergent ray after passing through the objective lens 5, so that an incident reflected ray located above the optical axis has a smaller incident angle compared to the parallel ray thereby resulting in a lower reflection factor. On the other hand, a reflected ray located below the optical axis has a higher incident angle compared to the parallel ray thereby resulting in a higher reflection factor. Consequently, the quantity of the reflected ray received by the photo-sensor 8 is not uniform and the quantity of the received ray on the light receiving surface 8A increases.

When the surface of the reflecting substance 6 displaces in a direction opposite to the direction X shown in FIG. 1, the reflected ray is a convergent ray after passing through the objective lens 5, so that the relation of the incident angle of the reflected ray is opposite to the above-mentioned divergent ray. Thus, the quantity of the reflected ray received on the light receiving surface 8B increases.

Thus, conventionally, by obtaining the output difference between the light receiving surfaces 8A and 8B of the divided photo-sensor 8, the relative positions between the surface portions of the reflecting substance 6 and the focus of the objective lens 5 are detected so that microdisplacement and/or surface roughness of the substance to be measured can be obtained.

However, in such a conventional measuring device, fluctuations of the quantity of the ray and non-uniformity of the quantity distribution caused by noise which essentially entrains in the laser ray source 1 are also detected by the photo-sensor 8. Thus, quantity change corresponding to the position of the reflecting substance 6 is disturbed. Both changes can not be distinguished from each other by such a conventional device.

SUMMARY OF THE INVENTION

The object of the present invention is to eliminate or at least mitigate the above mentioned disadvantage, and to provide an optical measuring device which can measure microdisplacement and/or surface roughness of a substance to be measured accurately without being affected by the noise caused by laser ray source.

To attain the above mentioned object, the optical measuring device, according to the present invention, of the type described above, comprises a ray dividing element to divide the reflected ray from the polarization prisms into two directions, two prism each receiving one divided ray and each having a reflecting surface forming substantially the critical angle relative to each optical axis of the reflected ray, and two divided photo detecting the elements each detecting ray quantity change of the reflected ray reflected from each corresponding prism. By superposing the output signals from the divided photo detecting elements, the adverse noise effect caused from the laser ray source can be substantially eliminated and accurate measurement value of microdisplacement and/or surface roughness of the surface of the substance to be measured can be obtained.

BRIEF DESCRIPTION OF THE DRAWING

These and other objects and advantages are hereinafter set forth and explained with reference to the drawing in which.

DETAILED DESCRIPTION OF A PREFERRED EMBODIMENT

Figure 3:
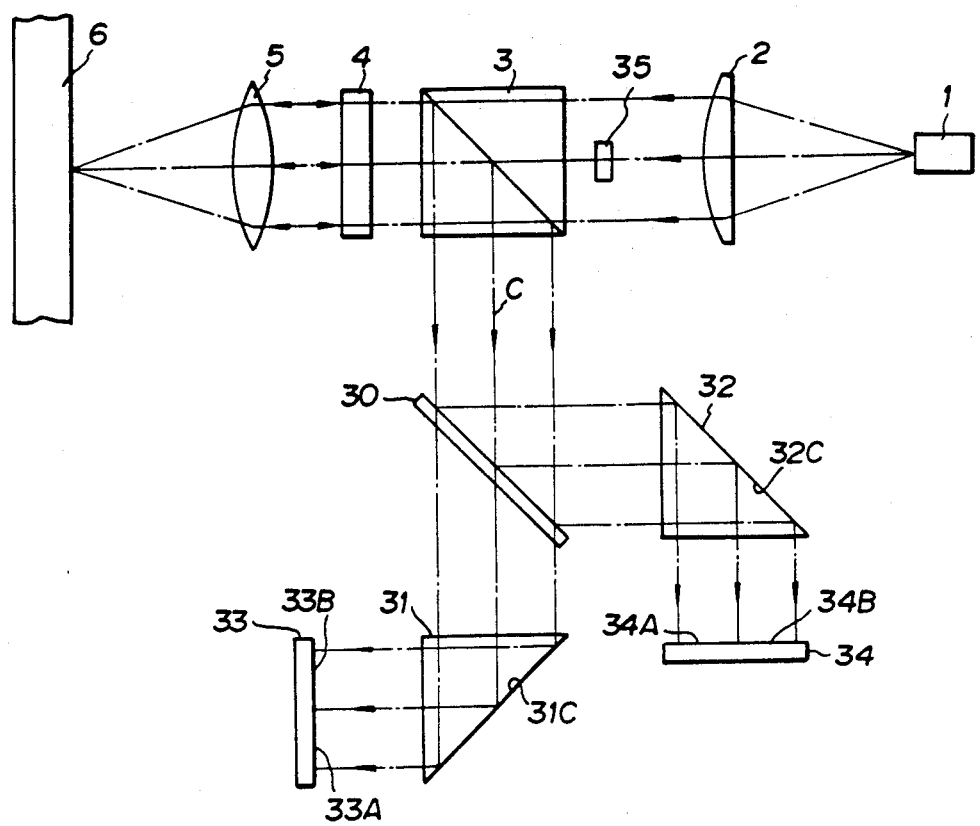
FIG. 3 is a diagrammatic representation of an optical measuring device according to one preferred embodiment of the present invention.
Figure 4:
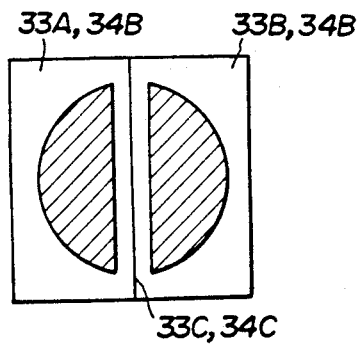
FIGS. 4 and 5 are plan views of divided photo-sensors shown in FIG. 3 to illustrate the function of the shield plate shown in FIG. 3.
Figure 5:
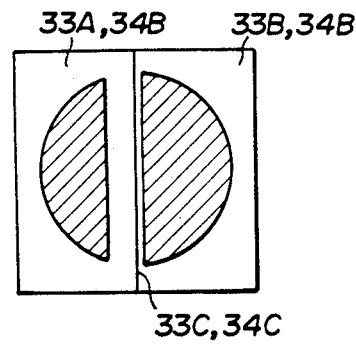

FIGS. 3–5 show an optical measuring device according to a preferred embodiment of the present invention. In FIG. 3, reference numerals similar to those used in FIG. 1 show the same or similar parts for sake of clarity, and such parts are not further described in detail.

Referring to FIG. 3, beam splitting means in the form of a half mirror 30 divides the reflected ray from the polarization prism 3 into two identical light beams or rays and applies the divided ray through detection prisms 31 and 32 to respective divided photo-sensors 33 and 34 which have two bisected light receiving regions 33A,B and 34A,B. The prisms 31 ans 32 are similar in material, dimension, and shape, and are arranged such that their reflecting surfaces 31C and 32C are substantially at the critical angle relative to the optical axis C. The surfaces of the prisms 31 and 32 are coated with suitable anti-reflection film. When the reflected ray is parallel, the angle of the reflecting surfaces 31C and 32C to the reflected ray is the same, and the division lines 33C and 34C of the divided photo-sensor 33 and 34 are cross with the optical axis C.

Figure 1:
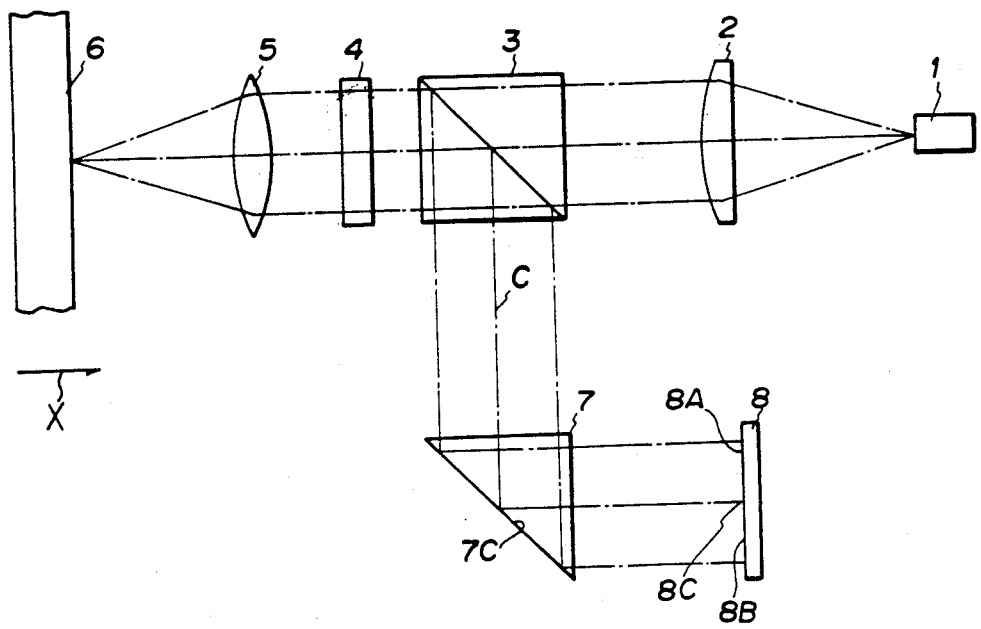
FIG. 1 is a diagrammatic representation of a conventional optical measuring device.
Figure 2:
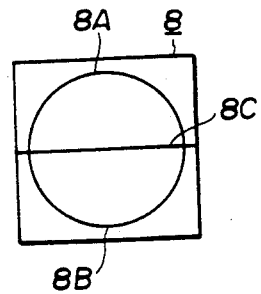
FIG. 2 is a plan view of the divided photo-sensor shown in FIG. 1.

The divided photo-sensors 33 and 34 are substantially similar to the divided photo-sensor 8 shown in FIG. 1, and have light receiving surfaces 33A, 33B and 34A, 34B respectively. The relative position between the set of the prism 31 and photo-sensor 33 and the set of the prism 32 and photo-sensor 34 is such that when one set is rotated about a point of crossing between the optical axis C and the incident surface of the half mirror 30, both sets are superposed on each other.

In operation, a reflected ray from the refractive substance 6 passes in a direction reverse to that of the incident ray and is reflected by the polarization prism 3. The reflected ray from the prism 3 is divided by the half mirror 30, and is applied to the prisms 31 and 32. The divided reflected rays from the prism 31 and 32 are respectively applied to the divided photo-sensors 33 and 34. When the surface of the reflecting substance 6 coincides with the focus of the objective lens 5, the reflected ray is parallel. Thus, as before, the quantity of ray received on each of the light receiving surfaces of the divided photo-sensors 33 and 34 is uniform. When the reflected ray is either a divergent ray or convergent ray, the outputs of the light receiving surfaces 33A, 33B and 34A, 34B of the divided photo-sensors 33 and 34 are varied correspondingly as described above with reference to the device shown in FIG. 1. Consequently, by substracting the sum of output $I_{33B}$ of the light receiving surface 33B and output $I_{34A}$ of the surface 34A from the sum of output $I_{33A}$ of the surface 33A and output $I_{34B}$ of the surface 34B, the position of the reflecting substance 6 can be detected.

This will be explained for the more detail in case of a divergent reflected ray. For sake of clarity, in the reflected ray from the polarization prism, the leftside region from the vertical optical axis C shown in FIG. 3 is designated as A along which a first component of the reflected ray travels and the rightside region of the ray is B along which a second component of the reflected ray travels. Reflection factor on the reflection surfaces 31C and 32C when the reflected ray is parallel is denoted as Ro. For the divergent ray in the region A, the reflection factor on the reflection surface 31C is larger than Ro according to the incident angle of the first component to the reflection surface 31C because the reflection surface 31C is inclined away from the first component, and the reflection factor on the reflection surface 32C is smaller than Ro because the reflection surface 32C is inclined to the first component. For the divergent ray in the region B, the reflection factor on the reflection surface 31C is smaller than Ro, and the reflection factor on the reflection surface 32C is larger than Ro. As a mean value, the reflection factor on the reflection surface 31C in the region A and the reflection factor on the reflection surface 32C in the region B are (Ro+r) respectively. Also, the reflection factor on the reflection surface 31C in the region B and the reflection factor on the reflection surface 32C in the region A are (Ro−r) respectively. Stated otherwise, on the reflection surface 31C, the first and second components are reflected by the reflection factors (Ro+r) and (Ro−r) respectively, and, on the reflection surface 32C, the first and second components are reflected by the reflection factors (Ro−r) and (Ro+r) respectively in a complementary manner relative to the reflection surface 31C. Thus the two reflected complementary rays are correlated with each other to compensate for fluctuation of the laser ray as described hereinbelow. In the explanation, r is determined by the divergency of the reflection ray, and $r > 0$, $R \gg r$.

Assuming that the quantity of the ray reflected in the region A is $(Io+\Delta I_A)$, and the quantity of the ray reflected in the region B is $(Io+\Delta I_B)$, the output detection signals from the divided photo-sensors 33 and 34 are represented as follows:

$$I_{33A} = \alpha(Ro+r)(Io+\Delta I_A)/2$$

$$I_{33B} = \alpha(Ro-r)(Io+\Delta I_B)/2$$

$$I_{34A} = \alpha(Ro-r)(Io+\Delta I_A)/2$$

$$I_{34B} = \alpha(Ro+r)(Io+\Delta I_B)/2$$

In the above formulae, $\Delta I_A$ and $\Delta I_B$ are the fluctuation of the quantity of the ray caused by the laser ray source 1, and are very small compared with the quantity Io. $\alpha$ is a proportion constant representing the efficiency of the divided photo-sensors 33 and 34.

From the above formulae the, relative position between the reflecting substance 6 and the focus of the objective lens 5 can be expressed as follows:

$$(I_{33A} + I_{34B}) - (I_{33B} + I_{34A}) = 2\alpha \cdot r \cdot Io + \alpha r(\Delta I_A + \Delta I_B) \qquad (1)$$

In comparison, in the known divided photo-sensor 8 shown in FIG. 1, the relative position can be expressed as follows, in which $I_{8A}$ and $I_{8B}$ are the outputs of the light receiving surfaces 8A and 8B respectively.

$$I_{8B} - I_{8A} = 2\alpha r Io + \alpha Ro(\Delta I_B - \Delta I_A) + \alpha r(\Delta I_A + \Delta I_B)$$

In the formulae (1) and (2), the term ($2\alpha rIo$) is the signal to be detected, and the other terms are noise components. Comparing the formulae (1) and (2), the formula (2) includes the term $\alpha Ro (\Delta I_B - \Delta I_A)$. Comparing the first and second terms of formula (2), Ro is much larger than r so that the value of the noise component second term can be larger than the signal component first term whether Io is much larger than $\Delta I_A$ or $\Delta I_B$. On the contrary, the formula (1) does not include the term $\alpha RO (\Delta I_A - \Delta I_B)$ so that noise from the laser ray source 1 does not essentially affect the signal to be detected.

As described in detail, by moving the whole optical device or the reflecting substance 6 in a plane parallel with the surface of the reflecting substance 6, and by comparing the signals corresponding to the formula (1), at start and end points, the surface roughness and/or microdisplacement of the reflecting substance 6 can be very accurately obtained.

In the embodiment shown in FIG. 3, a shield plate 35 is inserted between the laser beam source 1 and the objective lens 5, and in the illustrated embodiment the shield plate 35 is between the collimator lens 2 and the polarization prism 3. The shield plate 35 has a width in the direction normal to the figure, and acts to eliminate effects caused by inclination of the reflecting substance 6 relative to the optical axis. The shades or shadows of the shield plate 35 are shown in FIGS. 4 and 5 on the photo-sensors 33 and 34 as hatched areas. When the surface of the reflecting substance 6 is normal to the optical axis of the incident ray, the reflected ray is symmetrical to the division line 33C or 34C of the photo-sensor 33 or 34, as shown in FIG. 4. When the surface of the reflecting substance 6 is inclined to the optical axis of the incident ray, the shade or shadow of the shield plate 35 displaces rightwards or leftwards relative to the division line 33C or 34C, as shown in FIG. 5. This feature can be utilized to effect initial alignment of the optical device with the surface of the reflecting substance. Also, regardless of whether the surface of the reflecting substance 6 is inclined, it is assured that the outputs of the divided photo-sensors 33 and 34 are not changed by the inclination when a portion of the continuous ray quantity distribution range is not displaced into the adjacent light receiving surface over the division line 33C or 34C. Thus, the output signal can be stabilized and is reliable.

As described in detail, the optical measuring device, according to the invention, utilizes two prisms and two divided photo-sensors to detect the reflecting ray from the reflecting substance. So that the device is not affected by the noises caused by laser ray source, and the device is very accurate as compared with the conventional optical measuring device.

What is claimed is:

1. An optical measuring device comprising: a laser ray source for emitting a laser ray, an objective lens for condensing the ray from said laser ray source as an incident ray on a surface of a substance to be measured, a polarization element for passing the ray from the laser ray source to the objective lens and for guiding a reflected ray which is reflected from the surface of the substance and through the objective lens to a direction other than said ray source, a ray dividing element for dividing the reflected ray from the polarization element into two identical divided rays which are transmitted in two directions along two optical axes, two prisms each receiving one of the divided rays and each having a reflecting surface forming substantially the critical angle relative to each optical axis of the reflected ray, and two divided photo detecting elements each operative to detect the ray quantity change of the reflected ray reflected from its corresponding prism, the two divided photo detecting elements having a pair of divided light-receiving surfaces 33A and 33B and a pair of divided light-receiving surfaces 34A and 34B, respectively, for receiving thereon the reflected rays to produce outputs $I_{33}A$, $I_{33}B$, $I_{34}A$ and $I_{34}B$ corresponding to the ray quantities of the reflected rays received by the light-receiving surfaces 33A, 33B, 34A and 34B, respectively, so that the surface of the substance to be measured is detected on the basis of a difference between the sum of $I_{33}B$ and $I_{34}A$ and the sum of $I_{33}A$ and $I_{34}B$.

2. An optical measuring device as claimed in claim 1, wherein the surface of the substance to be measured is detected on the basis of a value obtained by subtracting the sum of $I_{33}B$ and $I_{34}A$ from the sum of $I_{33}A$ and $I_{34}B$.

3. An optical measuring device as claimed in claim 1, wherein a shield plate is disposed between the laser ray source and the objective lens.

4. An optical measuring device for optically measuring a surface characteristic of an object comprising: light projecting means for projecting a light beam along an optical axis onto an object to be measured; beam splitting means disposed along the optical axis of the reflected light beam which is reflected from the object for splitting the reflected light beam into two identical split light beams; two reflecting means disposed along the paths of the respective identical split light beams for reflecting the two identical split light beams to produce two complementary light beams correlated with each other to compensate for fluctuation of the light beam; and two photodetecting means each disposed to receive one of the complementary light beans for detecting the amount of light impinging thereon and producing corresponding output detection signals which can be combined to produce an output signal representative of the surface characteristic to be optically measured and which is essentially free of the fluctuation of the light beam.

5. An optical measuring device according to claim 4; wherein the light projecting means includes a polarizing prism disposed to pass the light beam to the object and to reflect the reflected light beam from the object to the beam splitting means.

6. An optical measuring device according to claim 5; wherein the light projecting means includes an objective lens disposed along the optical axis of the light beam for focusing the light beam passing through the polarizing prism on the object and for transmitting the reflected light beam from the object to the polarizing prism.

7. An optical measuring device according to claim 6; including a shield plate disposed along the optical axis upstream of the objective lens for introducing a shadow in the light beam.

8. An optical measuring device according to claim 7; wherein each photodetecting means comprises a divided photo-detecting element having two bisected light receiving regions each of which produces an output detection signal representative of the amount of light impinging thereon.

9. An optical measuring device according to claim 4; wherein each photodetecting means comprises a divided photo-detecting element having two bisected light receiving regions each of which produces an output detection signal representative of the amount of light impinging thereon.

10. An optical measuring device according to claim 4; wherein the light projecting means includes a light source for producing a light beam containing noise components; and the two photodetecting means include means for producing output detection signals which can be combined to produce an output signal representative of the surface characteristic and essentially free of the noise components.

11. An optical measuring device according to claim 10; wherein each photodetecting means comprises a divided photo-detecting element having two bisected light receiving regions each of which produces an output detection signal repesentative of the amount of light impinging thereon.

12. An optical measuring device according to claim 4; wherein the two reflecting means comprise two detection prisms each having a reflecting surface forming substantially the critical angle relative to each optical axis of the two identical split light beams.

13. An optical measuring device according to claim 12; wherein the two detection prisms are positioned relative to the respective two identical split light beams such that one detection prism can be superposed on the other detection prism when the one detection prism is rotated around a crossing point of the optical axis and the beam splitting means.

14. An optical measuring device according to claim 4; wherein the light projecting means projects a light beam comprised of first and second components divided from each other by an optical axis plane; and one reflecting means being inclined toward the first component and away from the second component of one of the two identical split light beams and the other reflecting means being inclined toward the second component and away from the first component of the other of the two identical split light beams.

* * * * *